United States Patent [19]

Russell et al.

[11] Patent Number: 4,725,197

[45] Date of Patent: Feb. 16, 1988

[54] DEVICES FOR IMPARTING ROTARY MOTION

[75] Inventors: Michael K. Russell, Prestbury; Colin Arlott, Bredon, both of England

[73] Assignee: NL Industries, Inc., New York, N.Y.

[21] Appl. No.: 779,722

[22] Filed: Sep. 24, 1985

[30] Foreign Application Priority Data

Oct. 4, 1984 [GB] United Kingdom ............... 8425110

[51] Int. Cl.⁴ .............................................. F01D 3/00
[52] U.S. Cl. .................................... 415/104; 415/501; 417/420; 310/103
[58] Field of Search ................ 417/420; 415/501, 502, 415/104, 107; 310/90, 80, 152, 154, 156, 103, 104

[56] References Cited

U.S. PATENT DOCUMENTS

| | | | |
|---|---|---|---|
| 3,932,068 | 1/1976 | Zimmermann | 417/420 |
| 3,936,683 | 2/1976 | Walker | 310/104 |
| 3,969,042 | 7/1976 | Bachler | 417/420 |
| 3,973,622 | 8/1976 | Laing | 417/420 |
| 3,992,132 | 11/1976 | Putt | 417/420 |
| 4,047,847 | 9/1977 | Oikawa | 417/420 |
| 4,057,369 | 11/1977 | Isenberg et al. | 415/107 |
| 4,538,081 | 8/1985 | Kamiya et al. | 310/90 |
| 4,589,822 | 5/1986 | Clausen et al. | 415/174 |
| 4,623,807 | 11/1986 | Nakamura | 310/90 |

Primary Examiner—Robert E. Garrett
Assistant Examiner—John T. Kwon
Attorney, Agent, or Firm—Browning, Bushman, Zamecki & Anderson

[57] ABSTRACT

A down-hole signal transmitter includes an annular impeller mounted on a cylindrical casing and arranged to be driven by the mud flow passing along a drill string. Each of the impeller and the casing incorporates two sets of magnets with their poles arranged axially relative to one another such that axial movement of the impeller in one direction will tend to be resisted by a force of magnetic repulsion acting between the first set of casing magnets and the second set of impeller magnets and axial movement of the impeller in the opposite direction will tend to be resisted by a force of magnetic repulsion acting between the second set of casing magnets and the first set of impeller magnets. In this way the axial thrust due to the fluid flow is largely taken up. Furthermore the magnetic coupling between the magnet sets in such as to enable driving torque to be transmitted by the impeller to a rotary drive member on which the casing magnets are mounted.

8 Claims, 3 Drawing Figures

DEVICES FOR IMPARTING ROTARY MOTION

BACKGROUND OF THE INVENTION

This invention relates to devices for imparting rotary motion, and is more particularly concerned with devices for converting the kinetic energy of a fluid flow into rotary motion (hereinafter referred to as devices "of the type defined"), for driving a generator or signalling instrument, for example.

In the drilling field, because of space limitations down-hole for the accommodation of batteries, and so as to avoid the problems associated with the need for frequent battery replacement, there are many circumstances in which it is desirable for electrical power to be generated down-hole by a turbogenerator driven by the mud flow (or for the mechanical energy required for driving a moving part down-hole to be generated directly by an impeller driven by the mud flow). Devices for performing these functions down-hole are known. For example, the applicants' British Patent Specifications Nos. 2,082,653A and 2,087,951A disclose an arrangement in which a mud-driven impeller drives both an electrical generator and a linearly-displaceable throttling member for generating pressure pulses in the mud flow with the object of transmitting measurement data to the surface. However, such known devices require the use of impeller bearings which are capable of accommodating a substantial thrust due to the mud flow acting on the impeller, and it is difficult to produce suitable bearings which have a long service life.

It is an object of the invention to provide a device of the type defined which is capable of a long service life, even under hostile conditions.

SUMMARY OF THE INVENTION

According to the invention there is provided a device of the type defined comprising a cylindrical casing having its axis aligned with the direction of fluid flow, and an annular impeller arranged to be driven by the fluid flow and surrounding the casing so as to be coaxial therewith, wherein each of the casing and the impeller incorporates at least two magnets, a first of which is closer to one axial end of the impeller and has at least one North pole facing radially outwards and at least one South pole facing radially inwards, and a second of which is closer to the other axial end of the impeller and has at least one South pole facing radially outwards and at least one North pole facing radially inwards, the impeller and casing magnets being so arranged relative to one another that axial movement of the impeller in relation to the casing in one direction will tend to be resisted by a force of magnetic repulsion acting between the first casing magnet and the second impeller magnet and axial movement of the impeller in relation to the casing in the opposite direction will tend to be resisted by a force of magnetic repulsion acting between the second casing magnet and the first impeller magnet.

With this arrangement therefore axial thrust due to the fluid flow acting on the impeller is largely taken up by the magnetic interaction between the casing magnets and the impeller magnets, and little or no axial thrust needs to be accommodated by axial bearings. Where such bearings are provided they need only be of very light construction and will not be subjected to rapid wear in use.

It is to be understood that the term "magnets" as applied to the casing and impeller magnets in this specification is intended to include not only permanent magnets and electromagnets but also inducted magnets such as are produced, for example, by magnetic polarisation of a piece of ferromagnetic material in a magnetic field.

In a preferred embodiment of the invention, the first casing magnet is disposed radially adjacent the first impeller magnet and the second casing magnet is disposed radially adjacent the second impeller magnet, whereby forces of magnetic attraction are set up between the two first magnets and between the two second magnets. In this case the first and second casing magnets are preferably axially adjacent one another, and the first and second impeller magnets are preferably axially adjacent one another.

In this preferred embodiment the casing magnets may be mounted on a rotary drive member which is arranged within the casing so as to be rotatable by driving torque transmitted to the drive member from the impeller by way of the magnetic coupling between the impeller and the drive member. The drive member may be mechanically connected to drive an electrical generator within the casing. The first and second magnets on each of the casing and the impeller each comprise a set of magnets consisting of an even number of magnets equiangularly distributed about the central axis with magnets having radially outwardly or inwardly facing South poles alternating circumferentially with magnets having radially outwardly or inwardly facing North poles, the first and second sets of magnets on each of the casing and the impeller being angularly offset relative to one another so that South poles of the first set are axially aligned with North poles in the second set and vice versa.

In a development of the invention the impeller incorporates at least one further magnet which is so arranged relative to the casing magnets as to tend to produce a further force of magnetic repulsion resisting axial movement of the impeller by the axial thrust due to the fluid flow acting on the impeller.

BRIEF DESCRIPTION OF THE DRAWINGS

In order that the invention may be more fully understood, a preferred form of device in accordance with the invention will now be described, by way of example, with reference to the accompanying drawings, in which.

DETAILED DESCRIPTION OF THE DRAWINGS

Figure 1:
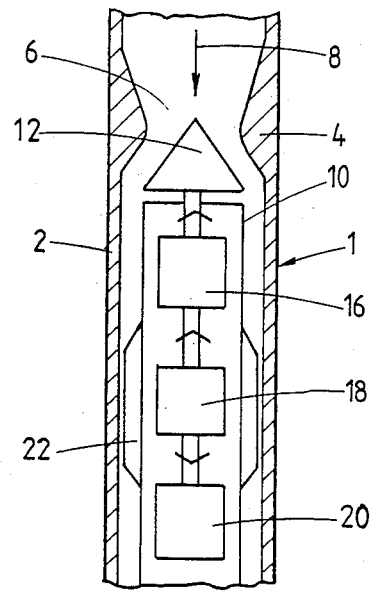
FIG. 1 is a diagram of a per se known down-hole signal transmitter with which the device of the invention may be used.

The per se known signal transmitter 1 illustrated in FIG. 1 is installed within a drill collar disposed at the end of a drill string within a borehole during drilling. The signal transmitter 1 serves to transmit measurement data to the surface, in the form of pressure pulses, by modulating the pressure of the mud which passes down the drill string.

The transmitter 1 includes a duct 2 provided at its upper end with an annular flow constrictor 4 defining a throttle orifice 6 for the mud flow passing down the drill string in the direction of the arrow 8. Within the duct 2 is an elongate casing 10 bearing at its upper end, in the vicinity of the throttle orifice 6, a throttling member 12 which is displaceable with respect to the casing 10 to vary the throughflow cross-section of the throttle orifice 6. An annular impeller 22 surrounds the casing 10 and is rotatable in the mud flow. The impeller 22 is magnetically coupled to a drive member 18 within the casing so as to drive the drive member 18 which in turn drives both a pump 16 and an electrical generator 20 for supplying electrical power down-hole. The pump 16 is provided to linearly displace the throttling member 12, the direction of displacement of the throttling member 12 being determined by a solenoid actuator (not shown) under control of an electrical input signal.

The detailed structure and operation of such a signal transmitter may be determined by reference to the applicants' British Patent Specification No. 2,123,458A, the contents of which are introduced herein by reference.

Figure 2:
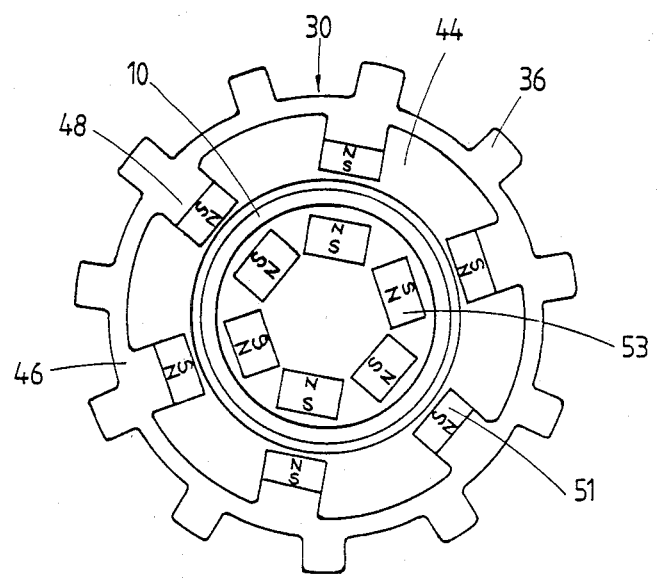
FIG. 2 is a cross-section through the device of the invention taken along the line II—II in FIG. 3; and, FIG. 3 is an axial section through the impeller on one side of the casing, it being understood that the complete section would be symmetrical about the axis A—A.
Figure 3:
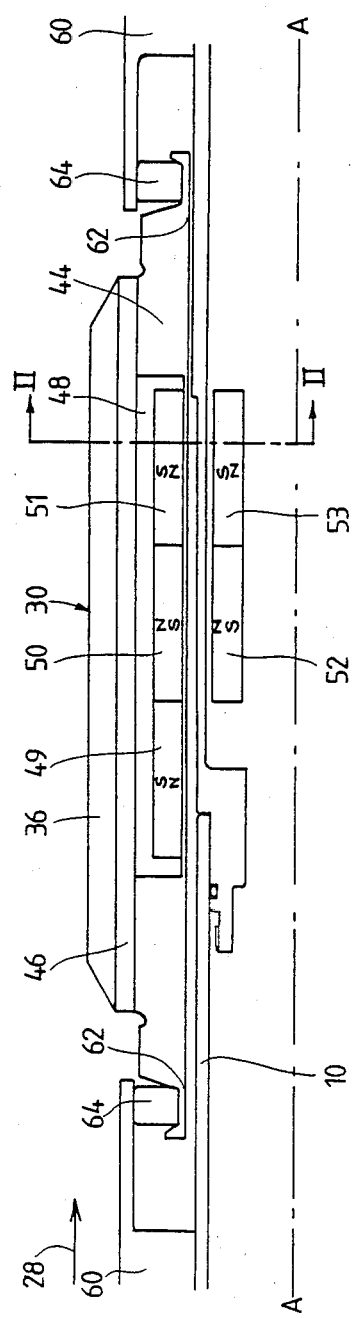

In the form of the device in accordance with the present invention which will not be described with reference to FIGS. 2 and 3 of the drawings, the impeller shown in the drawings of Specification No. 2,123,458A is replaced by the annular impeller 30 comprising an inner, magnet-bearing ring 44 and an outer, blade-bearing ring 46 bearing blades 36 canted to the mud flow direction 28. The ring 44 bears six longitudinal slots 48 in its outside surface, the slots 48 being equiangularly distributed about the circumference of the ring 44. Each slot 48 contains a series of three rare earth magnets 49, 50 and 51, preferably samarium-cobalt magnets. The three magnets 49, 50 and 51 in each slot 48 are arranged with their opposite poles facing respectively radially inward and radially outward, and the polarity of the inwardly facing (or outwardly facing) pole alternates along the row of three magnets. Furthermore, each set of six magnets 49, 50 or 51 equiangularly distributed about the central axis is arranged such that magnets having radially outwardly (or inwardly) facing South poles alternate circumferentially with magnets having radially outwardly (or inwardly) facing North poles. Clearly the three sets of magnets 49, 50 and 51 must be angularly offset relative to one another so as to ensure that the poles of the three magnets 49, 50 and 51 in each slot 48 alternate with one another in the axial direction.

In addition six sets of magnets, of similar type to the magnets 49, 50 and 51 on the impeller 30, are arranged in six longitudinal slots equiangularly distributed about the circumference of a driven shaft within the casing 10. The driven shaft is not specifically shown in FIGS. 2 and 3 in order to render these figures easier to read. Each set of magnets within each slot in the driven shaft comprises two magnets 52 and 53 arranged so that their poles alternate in an axial direction and furthermore so that the poles of the six sets of magnets alternate circumferentially, in a similar way to the magnets 49, 50 and 51 on the impeller 30.

The impeller 30 is rotatably mounted at each end with respect to the casing 10 by means of radially-acting roller bearings 64 acting between a respective collar 60 fixed to the casing 10 and a respective end 62 of the impeller 30. The bearings 64 are lubricated by the mud flow.

In operation the impeller 30 rotates in the mud flow and the magnetic coupling between the magnets 49, 50 and 51 on the impeller 30 and the magnets 52 and 53 on the driven shaft causes the driven shaft to be locked with respect to the impeller 30 so that the driven shaft is rotated by the impeller without the need for any direct mechanical connection or associated rotating seal. In this state, as shown in FIGS. 2 and 3, each inwardly facing pole of the impeller magnets 50 faces an outwardly facing pole of opposite polarity of the magnets 52 on the driven shaft, and each inwardly facing pole of the impeller magnets 51 faces an outwardly facing pole of opposite polarity of the magnets 53 on the driven shaft. In this position there will be magnetic interaction between like poles of the magnets 50 and 53 and between like poles of the magnets 51 and 52 which will tend to maintain axial alignment of the impeller 30 as shown in FIG. 3. If the impeller 30 is displaced to the right in FIG. 3 by virtue of an axial thrust exerted by the mud flow, the like poles of the magnets 50 and 53 will be moved closer together and such movement will tend to be resisted by a force of magnetic repulsion acting between these poles. Similarly, if the impeller 30 is moved to the left in FIG. 3, the like poles of the magnets 51 and 52 will be moved closer together and this will tend to be resisted by a force of magnetic repulsion acting between the magnets 51 and 52. Furthermore like poles on the magnets 49 and 52 will magnetically interact in order to provide greater resistance to movement of the impeller 30 to the right in FIG. 3, since this will be the direction in which the axial thrust exerted by the mud flow on the impeller 30 will act.

It will be appreciated that the above arrangement for magnetically supporting the impeller enables any axial thrust acting on the bearings to be almost entirely eliminated, so that the impeller bearings may be of the radially-acting type and the wear on these bearings in use will be at a relatively low level.

The above-described arrangement may be modified by adding additional sets of magnets on the impeller and/or the driven shaft in order to increase the axial resistance of the arrangement to the level required for a particular application.

What is claimed is:

1. A down-hole device for producing rotary motion from the mud flow within a borehole comprising a cylindrical casing having its axis aligned with the direction of mud flow, and an annular impeller arranged to be driven by the mud flow and surrounding the casing so as to be coaxial therewith, wherein each of the casing and the impeller incorporates at least two magnets, a first of which is closer to one axial end of the impeller and has at least one North pole facing radially outwards and at least one South pole facing radially inwards, and a second of which is closer to the other axial end of the impeller and has at least one South pole facing radially outwards and at least one North pole facing inwards, the impeller and casing magnets being so arranged relative to one another that axial movement of the impeller in relation to the casing in one direction will tend to be resisted by a force of magnetic repulsion acting between the first casing magnet and the second impeller magnet and axial movement of the impeller in relation to the casing in the opposite direction will tend to be resisted by a force of magnetic repulsion acting between the second casing magnet and the first impeller magnet.

2. A device according to claim 1, wherein the first casing magnet is disposed radially adjacent the first impeller magnet and the second casing magnet is disposed radially adjacent the second impeller magnet, whereby force of magnetic attraction are set up between the two first magnets and between the two second magnets.

3. A device according to claim 2, wherein the first and second casing magnets are axially adjacent one another, and the first and second impeller magnets are axially adjacent one another.

4. A device according to claim 1, wherein the casing magnets are mounted on a rotary drive member which is arranged within the casing so as to be rotatable by driving torque transmitted to the drive member by the impeller by way of the magnetic coupling between the impeller and the drive member.

5. A device according to claim 4, wherein the drive member is mechanically connected to drive an electrical generator within the casing.

6. A device according to claim 1, wherein the first and second magnets on each of the casing and the impeller each comprise a set of magnets consisting of an even number of magnets equiangularly distributed about the central axis with magnets having radially outwardly or inwardly facing South poles alternating circumferentially with magnets having radially outwardly or inwardly facing North poles.

7. A device according to claim 6, wherein the first and second sets of magnets on each of the casing and the impeller are angularly offset relative to one another so that South poles in the first set are axially aligned with North poles in the second set and North poles in the first set are axially aligned with South poles in the second set.

8. A device according to claim 1, wherein the impeller and/or casing incorporates at least one further magnet which is so arranged relative to the other magnets as to tend to produce a further force of magnetic repulsion resisting axial movement of the impeller by the axial thrust due to the mud flow acting on the impeller.

* * * * *